United States Patent
Schwerdtner et al.

(10) Patent No.: US 8,395,833 B2
(45) Date of Patent: Mar. 12, 2013

(54) HOLOGRAPHIC PROJECTION SYSTEM WITH OPTICAL WAVE TRACKING AND WITH MEANS FOR CORRECTING THE HOLOGRAPHIC RECONSTRUCTION

(75) Inventors: Armin Schwerdtner, Dresden (DE); Jean-Christophe Olaya, Berlin (DE); Stanislas Flon, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 581 days.

(21) Appl. No.: 12/595,402

(22) PCT Filed: Apr. 10, 2008

(86) PCT No.: PCT/EP2008/054339
§ 371 (c)(1),
(2), (4) Date: Dec. 8, 2009

(87) PCT Pub. No.: WO2008/122664
PCT Pub. Date: Oct. 16, 2008

(65) Prior Publication Data
US 2010/0103246 A1    Apr. 29, 2010

(30) Foreign Application Priority Data
Apr. 10, 2007  (DE) .......................... 10 2007 018 266

(51) Int. Cl.
*G03H 1/08*    (2006.01)
(52) U.S. Cl. ............................................. 359/9
(58) Field of Classification Search ...................... 348/40
See application file for complete search history.

(56) References Cited

U.S. PATENT DOCUMENTS

| | | | | |
|---|---|---|---|---|
| 5,132,813 | A * | 7/1992 | Caulfield et al. | 359/11 |
| 5,291,316 | A * | 3/1994 | Haberman et al. | 359/13 |
| 5,416,621 | A * | 5/1995 | Tanaka et al. | 349/25 |
| 5,594,843 | A * | 1/1997 | O'Neill | 345/427 |
| 5,608,552 | A * | 3/1997 | Smith | 349/5 |
| 6,407,724 | B2 * | 6/2002 | Waldern et al. | 345/8 |
| 6,595,644 | B2 * | 7/2003 | Kostrzewski et al. | 353/7 |
| 6,631,017 | B2 * | 10/2003 | Khoury | 359/29 |

(Continued)

FOREIGN PATENT DOCUMENTS

| | | |
|---|---|---|
| DE | 10 2005 023743 | 11/2006 |
| DE | 10 2007 005822 | 8/2008 |

(Continued)

OTHER PUBLICATIONS

International Search Report, dated Aug. 11, 2008, issued in priority International Application No. PCT/EP2008/054339.

*Primary Examiner* — David Eng
(74) *Attorney, Agent, or Firm* — Saul Ewing LLP (57) ABSTRACT

A holographic projection system with a display screen and an optical wave tracking element for controlling the direction of propagation of a modulated wave uses a position controller and an eye finder. An extremely wide tracking range is realized in the projection system for simultaneous viewing of the reconstruction by multiple observers, which are situated beside one another. The reconstruction of the scene is reconstructed for each eye position of an observer such that the entire scene is visible in the visibility region in a large tracking range with minimal errors. The projection system reconstructs the scene with the help of modulated partial waves. Projection element(s) direct these partial waves with separately holographically reconstructed segments of the scene at the desired eye position through a structure of screen segments which are at least horizontally staggered on the display screen.

14 Claims, 5 Drawing Sheets

U.S. PATENT DOCUMENTS

| | | | |
|---|---|---|---|
| 6,760,135 B1 * | 7/2004 | Payne et al. | 359/15 |
| 6,927,748 B2 * | 8/2005 | Hughes et al. | 345/32 |
| 6,940,653 B2 * | 9/2005 | Favalora et al. | 359/619 |
| 6,995,882 B2 * | 2/2006 | Horimai | 359/2 |
| 7,043,073 B1 * | 5/2006 | Holzbach | 382/154 |
| 7,085,026 B2 * | 8/2006 | Horimai | 359/11 |
| 7,190,496 B2 * | 3/2007 | Klug et al. | 359/23 |
| 7,466,411 B2 * | 12/2008 | Riley et al. | 356/399 |
| 7,490,941 B2 * | 2/2009 | Mintz et al. | 353/7 |
| 7,554,706 B2 * | 6/2009 | Tsukagoshi et al. | 359/11 |
| 7,558,421 B1 * | 7/2009 | Holzbach | 382/154 |
| 7,568,445 B2 * | 8/2009 | Rosenberger et al. | 118/50.1 |
| 7,605,961 B2 * | 10/2009 | Klug et al. | 359/9 |
| 7,633,662 B2 * | 12/2009 | Riley et al. | 359/35 |
| 7,738,151 B2 * | 6/2010 | Garner et al. | 359/9 |
| 7,847,993 B2 * | 12/2010 | Yamauchi | 359/25 |
| 8,031,382 B2 * | 10/2011 | Johnson | 359/9 |
| 8,077,365 B2 * | 12/2011 | Cable | 359/9 |
| 8,149,266 B2 * | 4/2012 | Haussler et al. | 348/40 |
| 8,154,780 B2 * | 4/2012 | Cable et al. | 359/9 |
| 8,154,781 B2 * | 4/2012 | Kroll et al. | 359/9 |

FOREIGN PATENT DOCUMENTS

| | | |
|---|---|---|
| WO | WO 2004/044659 | 5/2004 |
| WO | WO 2006/119760 | 11/2006 |
| WO | WO 2006/119920 | 11/2006 |
| WO | WO 2008/025664 | 3/2008 |

* cited by examiner

HOLOGRAPHIC PROJECTION SYSTEM WITH OPTICAL WAVE TRACKING AND WITH MEANS FOR CORRECTING THE HOLOGRAPHIC RECONSTRUCTION

CROSS REFERENCE TO RELATED APPLICATIONS

This application claims the priority of PCT/EP2008/054339, filed on Apr. 10, 2008, which claims priority to German Application No. 10 2007 018266.1, filed Apr. 10, 2007, the entire contents of which are hereby incorporated in total by reference.

FIELD OF APPLICATION OF THE INVENTION

The present invention relates to a holographic projection system which, if an observer changes his position while watching a holographic reconstruction of a three-dimensional scene, tracks the propagation direction of a modulated light wave, which carries the holographic reconstruction, to the eye positions of a least one observer with the help of means for optical wave tracking, namely a position controller and an eye finder. The invention relates in particular to means for reducing the effect of optical deformations to the modulated light wave, which are caused by that wave tracking.

The invention is independent of the way the holographic information is provided, and it can be used in systems which allow multiple observers to watch holographically reconstructed video scenes simultaneously.

TECHNICAL BACKGROUND OF THE INVENTION

A holographic reconstruction system in the sense of this invention preferably reconstructs moving three-dimensional scenes holographically in real-time with the help of video means.

The system comprises continuously controllable spatial light modulator means, which spatially modulate the light waves which are capable of generating interference with holographic information. Thanks to the effects of light diffraction, the modulated light waves reconstruct object light points, by way of local interference, said object light points optically reconstructing the three-dimensional scene. Light waves propagate in a directed manner from all reconstructed object light points towards the observer eyes, so that one or multiple observers can see these object light points in the form of the scene. This means that in contrast to a stereoscopic representation, a holographic representation realises a substitution of the object.

In order to achieve a satisfying quality of holographic representations, the observers should also be able to watch a reconstruction in a viewing space which is as large as possible. Depending on the distance of an observer, this requires a representation of a holographically reconstructed scene with a display screen whose size is characterised by a screen diagonal typical of today's television and video screens as background.

However, it is disadvantageous that a large holographic representation requires for large diffraction angles a much higher resolution of the light modulator means than would be necessary for a two-dimensional representation, as is described by the known sampling theorem. This makes extraordinarily great demands on the hardware and software resources of the holographic reconstruction system both as concerns the components for real-time provision of holographic information for encoding, and those for optical reconstruction of the scene.

Another known problem in a reconstruction system is an undisturbed propagation of the modulated light waves prior to generating interference. In order to reconstruct the object light points at the correct position in space, and with the correct light point values, at least a part of the interfering light waves must arrive simultaneously at all the positions at which object light points are to be reconstructed through interference. This means that each object light point requires spatial coherence among as many as possible of the interfering light waves.

Moreover, after the reconstruction of the object light points, the path lengths of all object light points of a wave which represent the three-dimensional scene must not exhibit any uncontrolled path length differences among one another as caused by controllable optical means.

In the description below, the term 'optical axis' denotes a straight line which coincides with the axis of symmetry of a reflecting or refracting optical element. Spatial light modulator means, which have been encoded by a hologram processor with holographic information of a three-dimensional scene, represent a 'video hologram'. The interaction of a video hologram which is illuminated with coherent light with projection means causes a 'modulated wave' to be generated. The projection means define a 'direction of propagation' of the modulated wave, and this direction of propagation can be modified by 'optical wave tracking'. If optical elements are disposed on the way to or if their effective direction is towards the video hologram, they will be referred to as 'hologram-side', and if they are disposed on the way to or if their effective direction is towards an eye position of an observer eye, they will be referred to as 'observer-side'. A 'visibility region' describes a space which is disposed on the observer side at an eye position, and which represents the exit pupil of the system, and in which at least one observer eye must be situated for observing a reconstructed scene. If, as is the case in the present application, the modulated wave is tracked by wave tracking to the current eye positions, the 'tracking range' defines the space which embraces all eye positions for which wave tracking is possible. In the technical literature on the subject, such a projection system is also known as a projection system with eye tracking.

The applicant has already disclosed a number of holographic projection systems. For example, the international publication WO 2006/119760, titled "Projection device and method for the holographic reconstruction of scenes" describes a system which represents a holographic reconstruction of a three-dimensional scene in an enlarged manner.

This projection system takes advantage of a basic principle for holographic reconstruction, which has been described the first time by the applicant in their international publication no. WO 2004/044659, titled "Video hologram and device for reconstructing video holograms", and which shall be explained with reference to FIG. 1.

Figure 1:
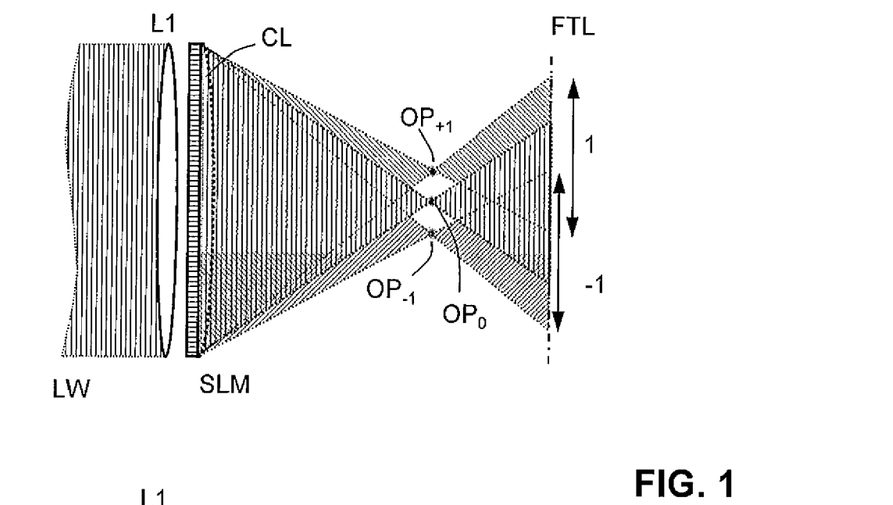
FIG. 1 shows a basic principle for holographic reconstruction, which has been described the first time by the applicant in their international publication no. WO 2004/044659, titled "Video hologram and device for reconstructing video holograms"

In this embodiment, a plane light wave LW which is capable of generating interference and which is emitted by a modulator illumination means (not shown) illuminates all modulator cells of a transmissive spatial light modulator SLM which is dynamically encoded with holographic information of the scene. The encoded modulator thus represents a video hologram. A focussing lens $L_1$, which realises a Fourier transformation of the light wave LW in its Fourier plane FTL, is disposed in front of the light modulator SLM, seen in the direction of light propagation. In a projection system, the light modulator SLM can modulate the incident wave LW with holographic information either in a transmissive grid mode, i.e. it can modulate a light wave which is capable of generating interference as it passes through the modulator, or it can serve as spatially controllable reflector. In either case, a modulated wave is created which reconstructs the object light points of the scene in the space in front of the Fourier plane FTL. The embodiment according to FIG. 1 shows only one object light point $OP_0$ of the reconstructed scene.

Because of their matrix arrangement, the modulator cells modulate the wave spatially and equidistantly, thereby diffracting the light, so that a spatial frequency spectrum which comprises multiple diffraction orders m of the video holograms in different positions is created in the Fourier plane FTL. FIG. 1 shows a small part of the spatial frequency spectrum with the help of the example of the desired object light point $OP_0$ in a selected diffraction order and the undesired reconstructed object light points $OP_{+1}$ and $OP_{-1}$ in adjacent diffraction orders. In the present embodiment, all modulator cells of the light modulator SLM are encoded for reconstructing the object light point $OP_0$. This has the same effect as a lens CL which is controllable through encoding and which has a corresponding focal length.

In the projection system which has been disclosed in the international publication no. WO 2006/119760, a video hologram is again encoded on the light modulator. A spatial frequency filter which lies in the Fourier plane spatially filters one diffraction order out of the spatial frequency spectrum of the video hologram, and an optical projection system projects this diffraction order of the wave in an enlarged manner onto a focussing display screen.

The display screen focuses the modulated wave with the reconstructed scene in front of an eye position. An observer can watch the reconstructed three-dimensional scene behind the eye position in a visibility region.

Because the display screen projects reconstructed object light points of all diffraction orders in its focal plane, an observer would also see disturbing diffraction orders with one eye which is situated outside the visibility region, i.e. the other eye that is not provided with the content of the currently represented video hologram. The spatial frequency filter AP has an aperture which must not be larger than one diffraction order, and it thus selects one diffraction order of the modulated light.

The display screen can be a lens. However, as explained above, the diameter of the display screen must be very large compared with the size of the optical projection system, so that the display screen is preferably a concave mirror.

The reconstruction is fixed with the modulated wave, so that it will only be visible if at least one eye of the observer is situated directly in the visibility region behind the eye position, which is not physically visible. If the reconstructed scene is to be visible without any restrictions when the observer moves, a position controller must track the optical path of the entire modulated wave by way of optical wave tracking to the respective observer eye such that the tip of the reconstruction space is always close to the respective observer eye. For this, the exemplary projection system comprises an eye finder, known as such, which detects the current positions of the observer eyes and which controls with the help of the position controller the optical path of the modulated wave such that the latter is directed towards a desired eye position. In a system which provides a specific video hologram for each observer eye, the desired eye position is always the position behind which the observer eye lies that corresponds with the currently encoded video hologram. The current video hologram must not be visible to the other eye.

In the international publication no. WO 2006/119920, titled "Device for holographic reconstruction of three-dimensional scenes", the applicant of this patent application discloses for example a holographic reconstruction device which requires the spatial light modulator means to be encoded specifically. In contrast to conventional video hologram encoding, where the holographic information is distributed across the entire modulator area, the applicant suggests to encode the information for each object light point of the scene only in a small region of the hologram which represents a sub-area of the entire encodable area of the light modulator means. The principle of encoding will be explained with reference to the FIGS. 2a and 2b, which show a detail of the holographic system according to FIG. 1. Both representations are limited to the modulation of the wave with holographic information. The further path of the wave is not shown.

If the light modulator SLM has a cell structure, corresponding additional object light points will unavoidably occur in other diffraction orders of the spatial frequency spectrum, represented in this example by the object light points $OP_{+1}$ and $OP_{-1}$ in the diffraction orders +1 and −1. Moreover, if the light modulator SLM carries the holographic information of a single object light point $OP_0$ in all modulator cells, as shown in FIG. 1, the light will propagate in a wide angle after having reconstructing the object points $OP_{+1}$, $OP_0$ and $OP_{-1}$, such that light from adjacent diffraction orders will always overlap in the Fourier plane FTL and all positions in the Fourier plane FTL will always also receive disturbing light portions from the undesired object light points $OP_{+1}$ and $OP_{-1}$, which cannot be removed by spatial filters. In order to avoid this drawback, the area of the encoded lens function CL must be adapted to the position of the object light point $OP_0$ in space when encoding the light modulator SLM.

Figure 2A:
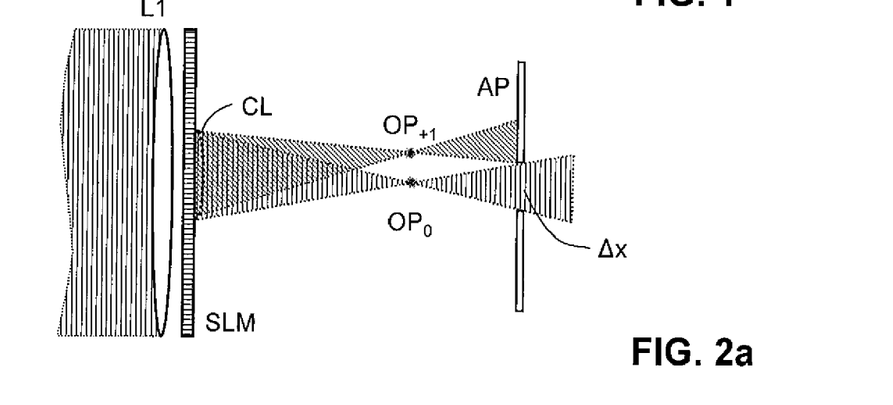
FIG. 2a shows a detail of the holographic system according to FIG. 1, which describes the encoding of the spatial light modulator means with the example of a single object light point of the three-dimensional scene.

FIG. 2a shows an embodiment illustrating the encoding principle, with a detail of the holographic system according to FIG. 1. In this embodiment, the spatial light modulator means are encoded with a lens function CL whose surface area is adapted to the position of the light point in space. The surface area is reduced depending on the position of the object light point $OP_0$ in space such that only light which reconstructs the object light point $OP_0$ of the selected diffraction order passes the aperture $\Delta x$ of a filter AP. In contrast, the filter AP blocks the light which reconstructs the undesired object light point $OP_{+1}$ of the adjacent diffraction order.

Figure 2B:
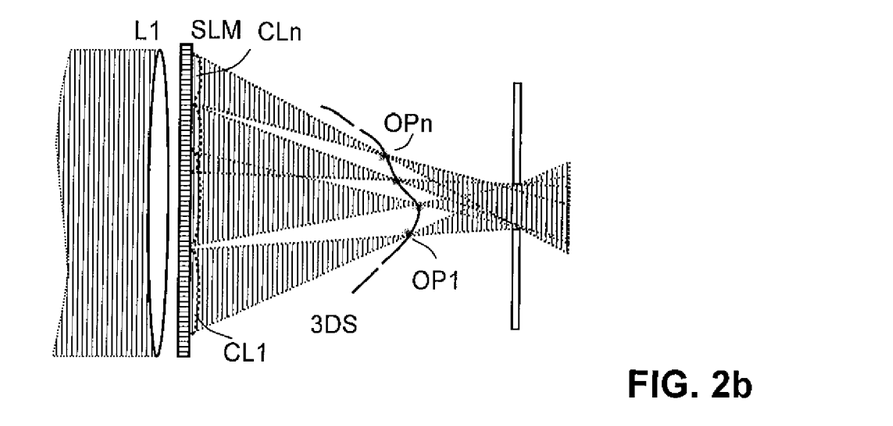
FIG. 2b shows the detail of the holographic system according to FIG. 1 with examples of the encoding of a section of the three-dimensional scene with selected object light points.

FIG. 2b shows the encoding process for a section of a three-dimensional scene 3DS with the help of few object light points $OP_1 \ldots OP_n$, said encoding process avoiding the light of adjacent diffraction orders to be overlapped using realisable spatial light modulator means. A computer-aided system controller (not shown) which controls the reconstruction process for all systems encodes with the help of a hologram processor for each single object point $OP_1 \ldots OP_n$ a separate lens $CL_1 \ldots CL_n$ of a multitude of adjacent modulator cells which, depending on its position in the reconstructed scene, lie in a confined region of the hologram of the light modulator area, such that all reconstructed light points in the Fourier plane FTL only emit their light to the used diffraction order. This prevents the light of adjacent diffraction orders from being overlapped, and undesired reconstructed object light points in unused diffraction orders from being visible through the exit pupil of the projection system.

In contrast to conventional holographic display devices, with this encoding method only the corresponding regions of the hologram carry the holographic information which is required for reconstructing the individual object light points of the scene. Only such object light points are encoded which must be visible from the current eye position in the visibility region, which is limited in its extent. This considerably reduces the computational load for encoding.

TECHNICAL PROBLEM OF THE INVENTION

In the projection system known from the international publication no. WO 2006/119760, the focussing display screen projects the light which is modulated with the holographic information and spatially filtered onto an eye position. This means that if an observer wants to watch the reconstructed scene, at least one observer eye must lie in the visibility region which corresponds to that eye position. Like every optical projection, this one is also prone to aberrations. In particular, a periodic change of the direction of propagation of the wave between the individual eye positions with the help of optical wave tracking causes the display screen to deform the spatial structure of the emitted wave depending on the eye positions. A considerable part of these deformations is represented by direction-of-propagation-specific aberrations, variable portions of which being effective, so that they cannot be compensated statically. The modulated wave which hits the focussing display screen at a large area is particularly sensitive to aberrations, such as spherical aberration, coma, field curvature, astigmatism and distortion.

Aberrations which depend mainly on the field size, i.e. field aberrations, fluctuating portions of which interfering depending on the position, are particularly disturbing. Aberrations may also vary strength in vertical and horizontal direction.

The present projection system with a focusing display screen, which generates for the desired eye positions an image of the selected diffraction order of the video holograms, causes, as the deviation of the direction of propagation from the axis increases, mainly variable system-specific aberrations, which deform the wave in different ways and effect significant damage to the reconstruction.

The above-described specific method of encoding the object light points in specific, confined regions of the hologram causes additional aberrations, e.g. field aberrations, which depend on the position of the hologram regions on the light modulator means, and which have been unknown in conventional projection systems.

In this particular case, the hologram processor only encodes each object point in a confined region of the hologram, so that the object light points which lie in marginal regions of the hologram are affected by aberrations in a different way than those object light points which lie near the axis.

Like any aberrations in the present projection system, the aberrations which occur due to the encoding greatly depend on the eye position at which the modulated wave is directed. Consequently, the system either does not reconstruct certain object points at all, or only outside the visibility region, or in a wrong spatial depth. In other words, aberrations of the display screen cause deformations within the partial waves, which become apparent as coma and astigmatism. This is why measures must be taken to ensure that light waves from the marginal regions of the display screen reach the visibility region for each eye position and that they reconstruct the object light points in the correct spatial depth.

As a result of frequently and rapidly changing eye positions, a dynamic, eye-position-dependent adaptation of the optical transfer function will be necessary, which cannot be achieved merely with the help of optical elements for error compensation which exhibit static optical parameters. In particular, the simultaneous reconstruction of a scene for multiple observers makes great demands on the compensation of horizontal field aberrations. An extremely wide tracking range is required to provide for convenient distances between the observers, which may measure as much as a few metres horizontally. It is not possible to track the modulated wave that far away from the screen axis with the help of an aberration correction using conventional wave formers.

A geometric screen shape with an optical transmission behaviour that directs the modulated light waves of all hologram regions for each possible eye position without any aberrations within a large tracking range into the same visibility region cannot objectively be realised.

SUMMARY OF THE INVENTION

Considering the above-mentioned problems of the prior art in dynamically adapting the compensation of optical errors in a large tracking range during optical wave tracking, it is the object of this invention to reduce the effects of aberrations of the optical elements, in particular of the display screen, such that the entire three-dimensional scene can be seen in the visibility region with as little errors as possible for each eye position of an observer in a large tracking range. In addition, all object light points of the 3D scene shall be reconstructed free of any aberrations if possible.

A major object of the invention is to realise the extremely wide tracking range, as described above, for simultaneous viewing of the reconstruction by multiple observers, which are situated beside one another.

The invention is based on a holographic projection system which comprises at least one holographic projector and one display screen.

Each holographic projector comprises spatial light modulator means which are sequentially encoded with a video hologram sequence, and projection means which project the video holograms onto the display screen. The spatial light modulator means modulate a wave which is capable of generating interference with holographic information which corresponds to at least one observer eye in order to reconstruct a preferably three-dimensional scene.

Each projector directs the modulated wave through the display screen to at least one desired eye position, where the holographic reconstruction which corresponds to that eye position thus becomes visible in a visibility region. Because the display screen is of a focussing type, the visibility region is significantly smaller than the display screen. The projection system can provide a second wave with respective holographic information for the other observer eye using in a time-multiplex process.

The projection system further comprises a position controller which adjusts a direction of propagation and an exit position from the projection means for the modulated wave. For this, the position controller receives from an eye position finder position data specifying the current eye position, which corresponds to the generated modulated wave, and thus directs the modulated wave through the display screen at the position of the observer eye depending on the position of the latter. In order to be able to follow position changes of an observer within a tracking range, the position controller dynamically tracks the exit position and direction of propagation of the modulated wave to the current eye position.

The projection system according to this invention holographically reconstructs the scene with partial waves which are modulated by the spatial modulator means with their multiple modulator segments. The projection means direct these partial waves with separately holographically reconstructed segments of the scene at the desired eye position through a structure of screen segments which are at least horizontally staggered on the display screen. In order to direct the modulated partial waves at the desired eye position correctly, a system controller adjusts an exit position and direction of propagation for each partial wave, according to their allocation to a screen segment of the display screen. Modulated partial waves from all screen segments arrive at the desired eye position, cumulate so to form an aggregated wave, thus rendering visible the holographic reconstruction of the three-dimensional scene in the visibility region.

According to the invention, the projection system generates the partial waves as the system controller discretely activates modulator segments which lie at different positions on the light modulator means. With the help of the position controller, the system controller adjusts for each partial wave which is modulated by an active modulator segment a specific direction of propagation and a corresponding exit position, which depend on both the position of the modulator segment on light modulator means and the position of the corresponding screen segment of the display screen.

The projection means thus direct a partial wave with a reconstructed segment of the scene through a corresponding screen segment of the display screen at the desired eye position, where all reconstructed segments together render the reconstructed scene visible.

A reconstruction of the scene using the means according to the present invention has the advantage that the system controller can adjust the wave propagation, through the direction of propagation and the exit positions, for each modulated partial wave to the position of the corresponding screen segment on the display screen and to the desired eye position in the tracking range. Depending on the desired eye position and the corresponding screen segment, the system controller adjusts for each modulated partial wave an angle of incidence on the display screen, so that the reconstructed segments of the scene of all partial waves appear with little aberration and completely on the desired eye position in the visibility region.

In an embodiment of this invention, the projection system generates the partial waves with the segments of the holographically reconstructed scene using a time-multiplex process with the help of only one holographic projector and software means. For this, the system controller periodically activates different modulator segments in the light modulator means of the projector within each video hologram and encodes them with the entire holographic information of a current video hologram. According to this embodiment of the invention, the system controller changes within each video hologram the exit position of the projector and the direction of propagation of the modulated current partial wave in synchronism with the activation of the modulator segments using the position controller.

In another embodiment of the invention, the projection system comprises multiple holographic projectors, which are distributed locally and which are controlled in a space multiplex process. Each projector is associated with one screen segment of a single display screen, and generates a discrete partial wave for that screen segment with a direction of propagation that corresponds to that screen segment. This has the advantage that, while the current video hologram is replayed, the exit position of the holographic projectors does not have to be moved in order to achieve an adjustment to another screen segment. It will only be moved in order to track the corresponding partial waves if the eye position changes. These movements can be performed at a significantly lower speed than the adjustment of exit position and direction of propagation to different screen segments during the period of a video hologram within a sequence of moving video holograms.

Generally, the project system can mechanically move the holographic projector in order to change the direction of propagation and the exit positions of the partial wave generated in a time-multiplex process. The position controller moves the projector in synchronism with the change of the active modulator segment.

A non-flickering representation of the reconstruction requires quick position changes of the exit position of the current partial wave. These position changes are difficult to achieve due to the moment of inertia of mechanical position systems.

Therefore, a preferred embodiment of the present invention comprises an adjustable optical wave tracking means which sequentially adjust the exit position and direction of propagation of the modulated partial waves to different screen segments within a video hologram using optical wave deflecting means. The optical wave deflecting means change the exit position and direction of propagation of the partial waves without any change of the physical position of the holographic projector. This has the advantage that the projector does not have to be moved at least for the sequential adjustment of the projection positions and direction of propagation to different screen segments. Such optical wave tracking means deflect the modulated partial waves for example with the help of a mirror system with partially moving mirrors.

Another preferred embodiment of this invention relates to a projection system which comprises hologram-side optical wave splitter means. The wave splitter means take advantage of for example a system of fully reflective and semi-reflective mirrors for optically splitting a modulated wave front of the current video hologram of the scene, which is generated by a holographic projector, into multiple partial wave fronts. The holographic information of the current, spatially filtered video hologram, which is generated by a single holographic projector, is divided optically in a space-multiplex process such that one partial wave front runs from each exit position of multiple exit positions of the wave front splitter means to one corresponding screen segment of a common display screen. This means that the wave splitter means provides multiple partial waves, i.e. one each at multiple exit positions, depending on the current eye position, said partial waves carrying holographic information of the locally different modulator segments, and directs them in different directions of propagation towards the display screen, so that they run to the visibility region at the current eye position through different screen segments. The optical wave splitter means can comprise adjustable wave tracking means which adjust all exit positions and corresponding directions of propagation of each modulated partial wave according to the current eye position.

SHORT DESCRIPTION OF FIGURES

The solution according to this invention will now be explained in more detail with the help of embodiments and accompanying drawings, wherein.

DETAILED DESCRIPTION OF THE INVENTION

Figure 3:
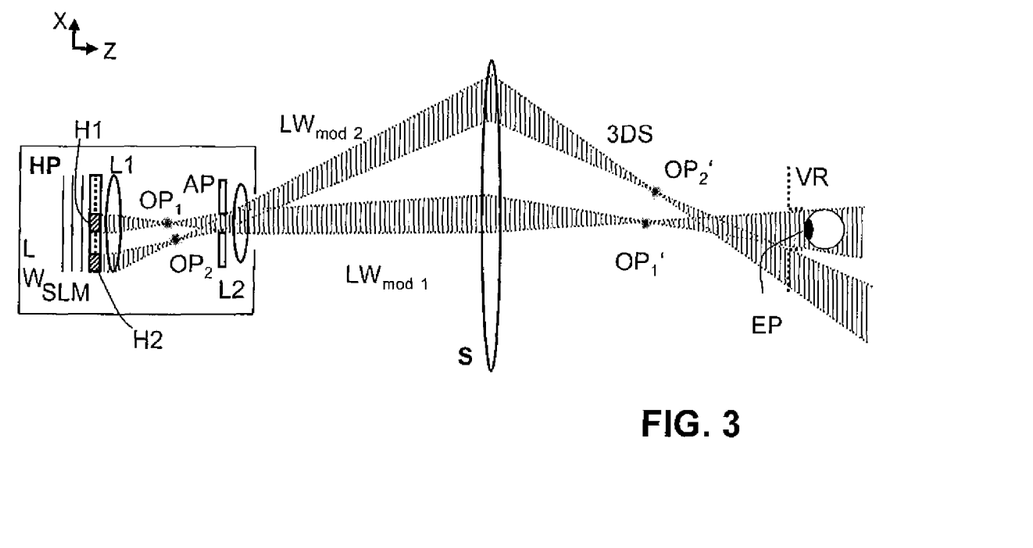
FIG. 3 is an example of a holographic system with a holographic projector and a display screen.

FIG. 3 describes the basic principle of a holographic projection system which is used for the embodiment of this invention. The problem which is solved by the invention will be described again in this context. The holographic projection system comprises mainly a holographic projector HP and a focussing display screen S, which shall be very large in order to have a wide viewing angle, and which shall either be transmissive, i.e. a lens, or reflective, i.e. a concave mirror, and it also comprises a computer-aided system controller (not shown).

The holographic projector HP comprises a modulator illumination means which illuminates the modulator surface of a spatial light modulator SLM with a plane wave LW which is capable of generating interference. The light modulator SLM has an areal arrangement of modulator cells, which are dynamically encoded by a hologram processor (not shown) with holographic information of a desired three-dimensional scene. Like in conventional holographic systems, the encoded modulator cells form a dynamic video hologram which modulates the wave LW with holographic information. The surface area of the modulator cells has a diagonal of few centimeters, for example. The light modulator SLM can either be a micro-mechanical display, for example a so-called micro-electro-mechanical system (MEMS), or a liquid crystal on silicon (LCoS) micro display, which are used for both data and video projection. In the illustrated embodiment, the wave LW passes through a transmissive light modulator SLM. However, if the optical arrangement known as such is modified accordingly, a reflective light modulator can be used instead as well. A Fourier transform of the modulated wave is created in an image plane of the modulator illumination means by way of transformation of a focussing lens L1. A filter AP is disposed there which only lets pass one diffraction order of the modulated light. An optical projection system L2 projects the light modulator SLM in an enlarged manner onto a focussing display screen S, which projects the spatially filtered spatial spectrum onto the current eye position EP, which has been detected by an eye finder for the wave tracking means. When projecting the filtered spatial spectrum, the geometry of the filter AP in the exit pupil of the system forms the visibility region VR through which an observer can watch the holographically reconstructed scene.

Only two selected individual object light points, $OP_1$ and $OP_2$, of a three-dimensional scene with multiple object light points $LP_m$, which shall appear as holographically reconstructed scene 3DS in front of the current eye position EP, will be considered here. These points were selected from multiple object light points of the scene. The two object light points are spatially arranged in the scene such that the holographic information for the reconstruction of both object light points, for the object light point $OP_1$ is encoded in a hologram region $H_1$ in the centre of the light modulator SLM, while the information for the object light point $OP_2$ is encoded in a hologram region $H_2$ at the fringe of the light modulator SLM. The hologram region $H_1$ thus modulates a light wave $LW_{mod1}$, which reconstructs the object light point $OP_1$ and which hits the centre of the display screen S, whereas the modulated light wave from the hologram region $H_2$ hits the fringe of the display screen S.

However, it is disadvantageous that due to aberrations on the display screen S, modulated light waves from hologram regions at the fringe of the light modulator SLM are not directed to the visibility region VR for each possible eye position in which an observer can be situated within a tracking range. As described above, these aberrations depend on the position. Therefore, the aberrations can not be entirely compensated using a static correction means through a required large tracking range.

FIG. 3 clearly shows that the system reconstructs the object light point $OP_2$ correctly. However, the display screen S projects a corresponding image $OP_2'$ to an incorrect position. The modulated partial light wave $LW_{mod2}$ of the selected object light point $OP_2$ misses the visibility region VR, so that an observer cannot perceive this object light point. This effect will be denoted in this document as vignetting.

Figure 4:
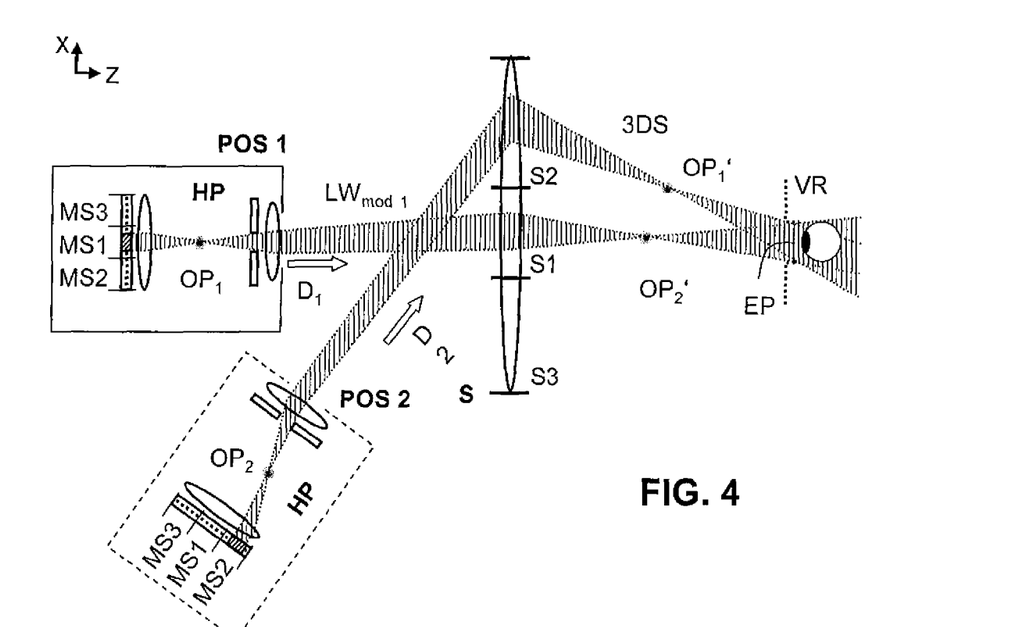
FIG. 4 shows a general embodiment of a holographic projection system according to this invention, with a holographic reconstruction of segments.

FIG. 4 shows the projection system according to the present invention. In contrast to a conventional holographic projection system, the inventive system always only projects the wave, which is modulated with holographic information, with the help of individual screen segments on the display screen S. The computer-aided system controller (not shown), which is typically used for holographic display systems in order to control the reconstruction process, associates the modulator cells in the holographic projector with different modulator segments $MS_1 \ldots MS_3$. The light modulator SLM thus carries in an active modulator segment $MS_1$ the exemplarily shown hologram region $H_1$, which modulates the light wave LW such that the system holographically reconstructs the object light point $OP_1$ together with further object light points (not shown) from the spatial environment of the selected object light point $OP_1$. This means that the active modulator segment $MS_1$ simultaneously carries a multitude of further hologram regions, which are partly overlapped, and which reconstruct other object light points (not shown) from the environment of the selected object light point $OP_1$ as a segment of the scene.

The system controller encodes all other modulator segments like the modulator segment $MS_1$ in a time-multiplex process with a multitude of hologram regions from a common object environment. After sequential activation by the system controller, each modulator segment modulates the partial wave which is associated to it with a corresponding part of the holographic information. The association of the information of the current video hologram is realised such that all partial waves with an own sub-section together reconstruct the three-dimensional scene.

The optical projection system $L_2$ projects the reconstructed object light point $OP_1$ together with other reconstructed object light points, which are also encoded on the light modulator segment $MS_1$, but which are not shown in FIG. 4, onto a screen segment $S_1$ of the display screen S.

According to the present invention, the computer-aided system controller activates the modulator segment $MS_1$ of the SLM, e.g. by discretely switching a segment of the modulator illumination means, which is structured accordingly. The latter can for example be a plane modulator illumination means for the spatial light modulator SLM, where another spatial light modulator which is controlled by the system controller is disposed in the optical path of the encoded light modulator SLM in order to let pass the illumination for individual modulator segments in a time-multiplex process. Alternatively, the system controller can also blank out modulator segments of the encoded light modulator SLM which are not used.

Further, with the help of the position controller, the system controller adjusts the holographic projector HP such that it has an exit position $POS_1$ with an orientation $D_1$ of the modulated wave that corresponds to the active modulator segment $MS_1$. The active modulator segment $MS_1$ thus directs a partial wave with a reconstructed segment of the scene through the corresponding screen segment $S_1$ at the desired eye position EP.

Because the dimension of the visibility region can be reduced to the size of an eye pupil, it is necessary to align the modulated partial waves in a time-multiplex process in the present embodiment to the eye position which corresponds to the current partial waves by way of wave tracking and to track them to any movement of the eye within a tracking range.

For example, the computer-aided system controller can mechanically track the exit position of the holographic projector HP, or an seeming change of the exit position is preferably realised by optical wave tracking, e.g. with the help of moving mirrors.

As shown in FIG. 4, the holographic projector is in an exit position $POS_1$ at a first point of time. At that time, only the modulator segment $MS_1$ is active, which comprises beside hologram regions which are not shown the hologram region $H_1$ for the object light point $OP_1$. The holographic projector is in an exit position $POS_1$ with an orientation $D_1$, where the optical projection system $L_2$ projects the modulated partial wave $LW_{mod1}$ onto the screen segment $S_1$, which is situated in the centre of the display screen S. The fix, focussing display screen S also projects the reconstructed object light point $OP_1'$ such that the latter appears in the visibility region VR.

At another point of time, for the object light point $OP_2$, the system controller moves the holographic projector HP to an exit position $POS_2$ and activates the modulator segment $MS_2$ comprising the hologram region $H_2$. In the exit position $POS_2$, the optical projection system $L_2$ projects the reconstructed object light point $OP_2$ through a screen segment $S_2$ of the display screen S. The exit position $POS_2$ and the orientation $D_2$ of the projector are adjusted such that the modulated partial wave $LW_{mod2}$ also reaches the visibility region without vignetting, so that the reconstructed object light point $OP_2'$ is seen there without disturbance.

Generating the modulated partial waves $LW_{mod1}$ and $LW_{mod2}$ in a time-multiplex process requires an alternation of the exit positions $POS_1$ and $POS_2$ with a repeat rate which is high enough for the observer eye to perceive in the visibility region a homogenous reconstruction of the object light points without flickering, i.e. at least 25 Hz.

The embodiment according to FIG. 4 only shows two screen segments and two exit positions, to give an example. However, in particular a greater number of screen segments with corresponding exit positions serves to solve the problem.

The number of required screen segments depends on the size of the display screen and on the tracking range of the position controller. The size of each modulator segment, and form and size of the display screen S should preferably be dimensioned such that the corresponding wave reaches the eye position with an extent which does not exceed the extent of the visibility region.

Figure 5:
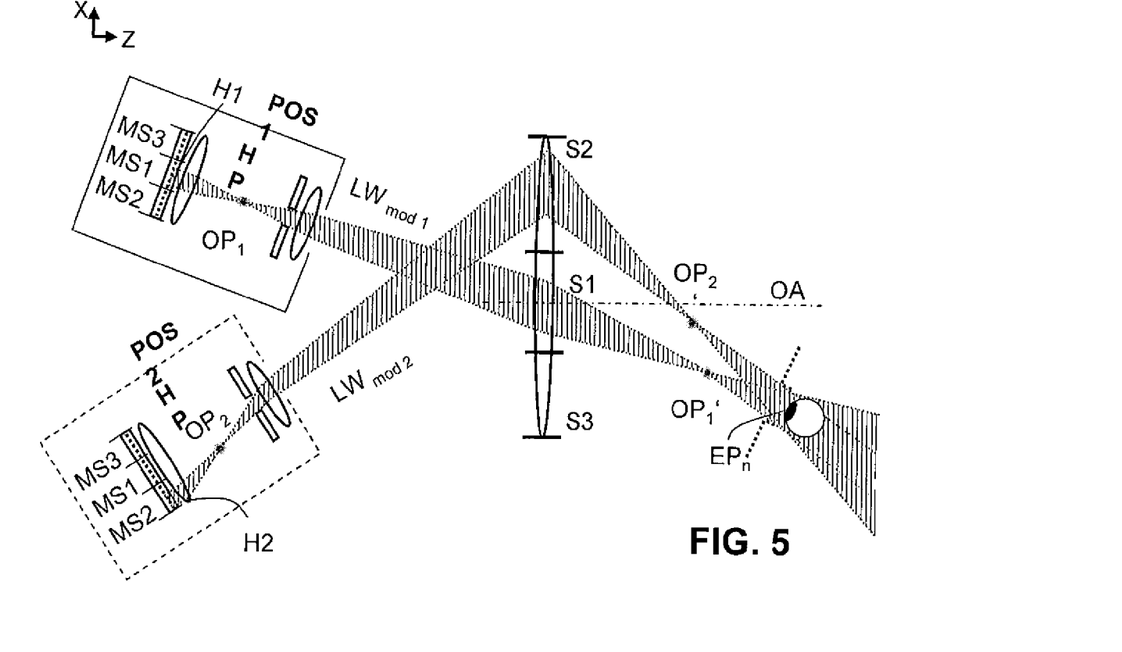
FIG. 5 shows details of the projection system according to FIG. 4, where reconstruction segments are used to laterally track the visibility region to an observer.

FIG. 5 illustrates in detail the reconstruction of a scene with separate modulated partial waves, which propagate through different segments. Therein, the light modulator SLM comprises modulator segments $MS_1 \ldots MS_3$, and the display screen S comprises respective screen segments $S_1 \ldots S_3$. A position controller being a module of the system controller software has tracked the partial waves to the observer onto a new eye position $EP_n$, as shown in FIG. 5. In that case, the visibility region VR lies clearly away from the optical axis OA of the display screen S, and the aberrations of the display screen can no longer be compensated with the help of static aberration correction means.

In a first period of time, the holographic projector HP is situated in an exit position $POS_1$, and the modulator segment $MS_1$ with the hologram region $H_1$ for the object light point $OP_1$ is active. During that time, an observer at the eye position $EP_A$ sees the reconstructed object light point $OP_1'$ through the screen segment $S_1$.

In a second period of time, the holographic projector HP is situated in the exit position $POS_2$. Here, the modulator segment $MS_2$ with the hologram region $H_2$ for the object light point $OP_2'$ is active, and the optical projection system $L_2$ projects the modulator segment $MS_2$ onto the screen segment $S_2$. Compared with the exit position $POS_E$, the exit position $POS_2$ of the projection system has been changed such that the partial wave $LW_{mod2}$ reaches the visibility region VR despite the aberrations caused by the display screen S. The aberrations of the display screen S are thus compensated with the help of the position and orientation of the projection system. In this second period of time, an observer in the visibility region VR sees the object light point $OP_2'$ through the screen segment $S_2$.

The same applies to a third period of time (not shown) and a corresponding screen segment $S_3$.

The activation of the modulator segments and the alteration of exit position and direction of propagation of the partial waves must be performed at such a fast pace that the observer still perceives the reconstruction as a whole. The entire process shall thus be realised with a repeat rate of at least 25 Hz.

The width of the modulator segments and thus also that of the screen segments depends on the one hand on the aberrations of the display screen in the required tracking range. The maximum width of a modulator segment also depends on the other hand on the width of the visibility region, because all parts of the holographically reconstructed segment of the scene must be perceivable in the visibility region.

Moreover, each modulator segment must be wide enough for a sufficient number of modulator cells to contribute to the reconstruction of an object light point. The segment width thus also determines the required sharpness of the holographic reconstruction. A width which is too small would result in a broadened and blurred reconstruction of the object light point.

Each modulator segment on the light modulator SLM also comprises a multitude of hologram regions, because in practice millions of object light points are required for the reconstruction of a scene. On the other hand, a hologram region of a single object point can also be distributed on to multiple modulator segments, for example if this object light point lies in the foreground of the scene. The segments can also have different widths.

Figure 6:
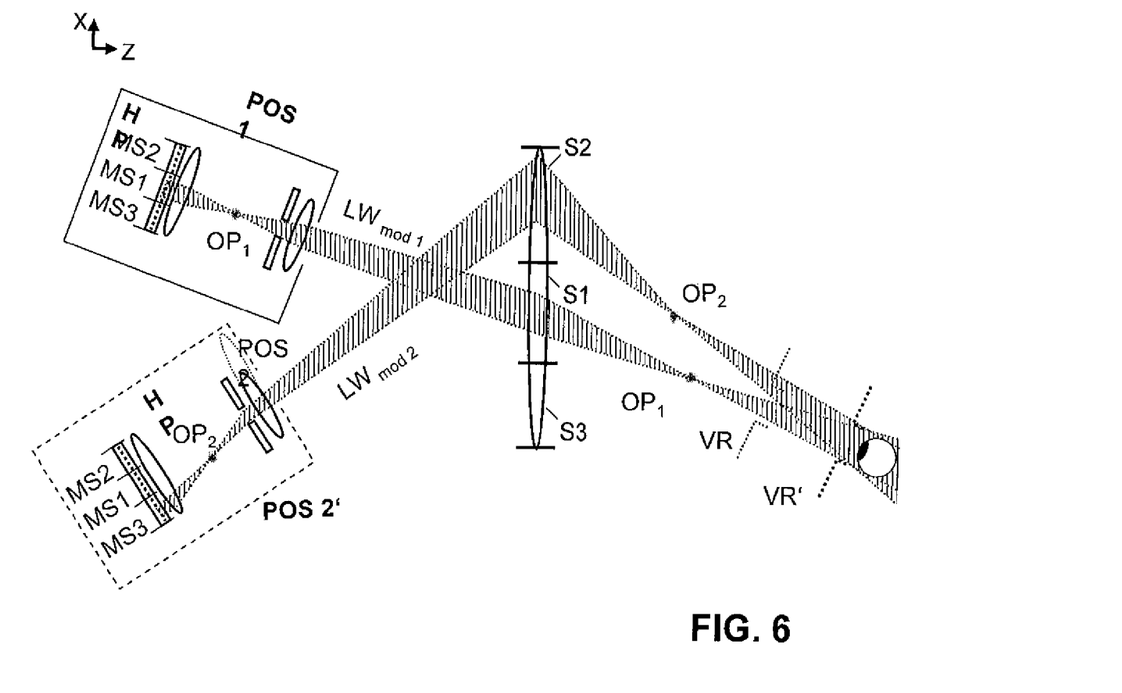
FIG. 6 shows the embodiment according to FIG. 4, where the visibility region is axially tracked to an observer.

FIG. 5 shows how the solution according to this invention is used in order to laterally move the visibility region towards an eye position which lies aside of the optical axis OA of the display screen S. In contrast, FIG. 6 shows how to tracking is realised with the help of the embodiments of this invention, if an observer moves along the screen axis towards the visibility region VR'.

To achieve this, the holographic projector HP for the screen segment $S_2$ is moved from the initial exit position $POS_2$ towards the new exit position $POS_2'$. The modulated partial waves $LW_{mod1}$ and $LW_{mod2}$ do no longer intersect in the initial visibility region VR, but in the new visibility region VR', which lies in a different observer plane. The same applies to the exit position of the holographic projector HP and the direction of propagation of the partial waves through the screen segment $S_3$. The screen segments, in turn, are used one after another. The observer thus sees all reconstructed object light points in the new visibility region VR'.

The extents of all segments are dimensioned such that the light of each segment reaches the visibility region.

It is obvious for a person skilled in the art that the position of the holographic projector HP can be adjusted similarly For axial and lateral tracking of the wave to other eye positions.

It is disadvantageous that changes of the local exit position of the holographic projector HP and its orientation, as described above, can hardly be achieved at sufficient speed in practice when the projector is moved mechanically.

Figure 7:
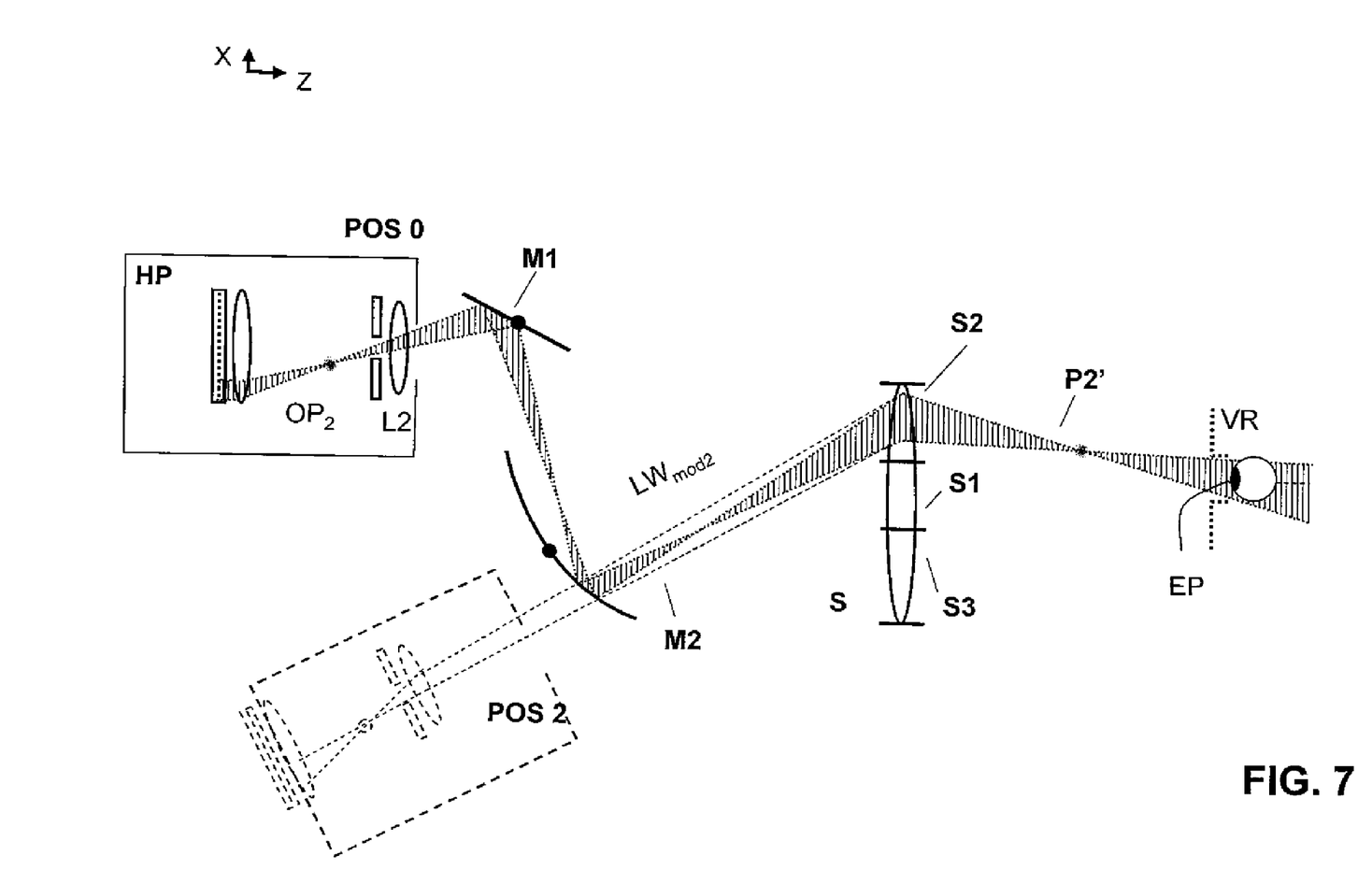
FIG. 7 shows another embodiment of the invention, where the wave tracking means adjust the exit position and direction of propagation of the modulated partial wave.

FIG. 7 thus shows an embodiment which solves the problem with the help of optical wave tracking. The wave tracking means is disposed between the holographic projector and the display screen. The tracking means comprises for example a pivoted tracking mirror $M_1$ and a curved tilted mirror $M_2$ in order to deflect the modulated partial wave to the observer via the optical projection system $L_2$ of the projector. This causes that the modulated partial wave exhibits a different exit position and direction of propagation towards the display screen. The projector itself remains in the fix central position $POS_0$ when changing the exit position and direction of propagation. The tilted mirror $M_2$ is larger than the incident partial wave in order to avoid that the exit position is must be adjusted by mechanical displacement. Its curvature causes the tilted mirror to project the spatially filtered wave in an enlarged manner onto the corresponding screen segment. Such a tracking device with mirrors has been sufficiently disclosed by the applicant in their previous patent application no. DE 10 2007 005 822.7, titled "Holographic reconstruction system with optical wave tracking means".

The tracking mirror $M_1$ and the tilted mirror $M_2$ are positioned and adjusted such that the partial wave $LW_{mod}$ exhibits a wave path as if it came from the virtual exit position $POS_2$. The partial wave $LW_{mod}$ hits the screen segment $S_2$ of the display screen S at such an angle that it proceeds to the visibility region VR. The aberrations of the display screen S are thus reduced by moving the tracking mirror $M_1$ and titled mirror $M_2$. The same applies to the segments $S_1$ to $S_3$.

The described solution has the advantage that in conjunction with the optical wave tracking means with an elliptic mirror segment, as described in the patent application no. DE 10 2007 005 822.7, the realisation of virtual exit positions and direction adjustment is easier than physically moving and adjusting the projector at high speed.

Figure 8A:
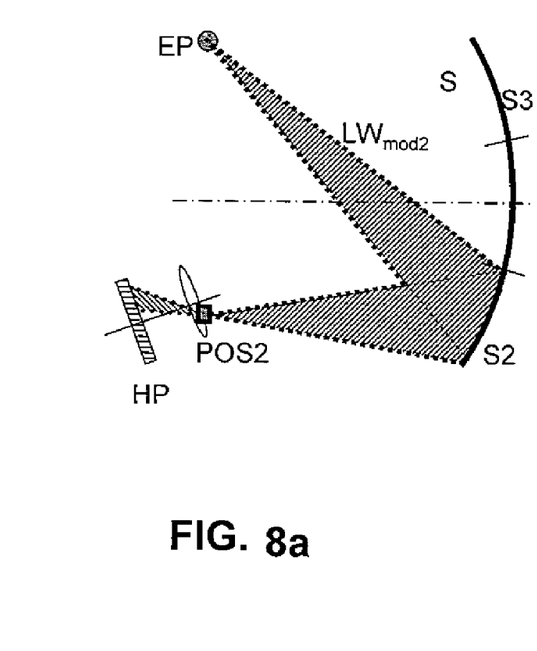
FIGS. 8a to 8c show another embodiment of the invention, illustrating a projection system which uses a focussing reflector as display screen.
Figure 8B:
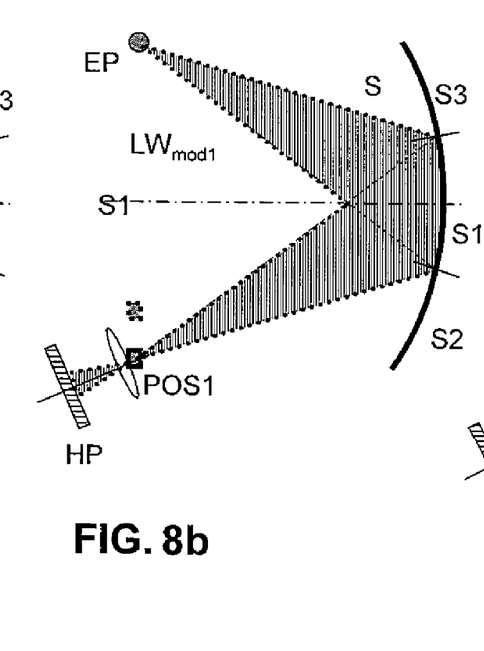
Figure 8C:
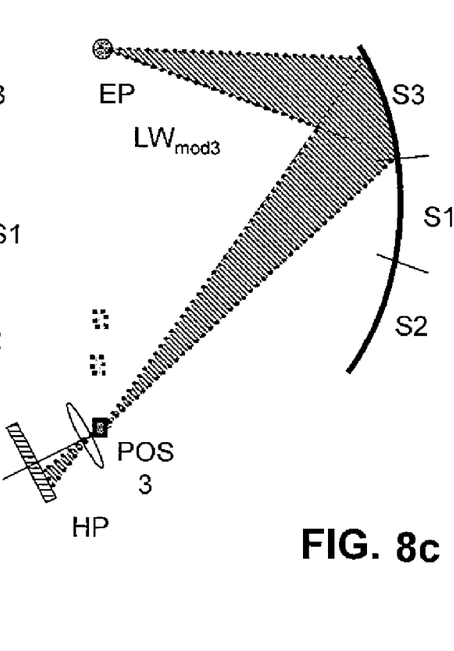

FIGS. 8a to 8c show another embodiment of the invention of a projection system which uses a focussing reflector as a display screen. In order to keep the aberrations small, the display screen S has the form of a segment of an ellipsoid. The eye position EP lies in one focal point of the ellipsoid, and the exit pupil of the holographic projector HP oscillates around the other focal point, namely between the exit positions $POS_1$ to $POS_3$. Each of the three sub-figures shows the generation of a partial wave $LW_{mod1}$, $LW_{mod2}$ and $LW_{mod3}$, respectively, in a time-multiplex process. In order to avoid jumps in the motion sequence when positioning the projector, the partial waves are provided in the following order: $LW_{mod2}$, $LW_{mod1}$ and $LW_{mod3}$.

In the present invention, the system controller can deactivate those modulator segments in the light modulator SLM which are not required for the reconstruction most easily by blocking them from being encoded with a hologram. In an amplitude-modulating light modulator SLM, the amplitude of the cells in the segments which shall not be activated can be set to zero.

In order to activate modulator segments, an additional switching light modulator can be disposed in the optical path of the light modulator SLM, said switching light modulator transmitting or blocking the light in individual segments.

The specific advantages of the solution according to this invention are that all pencils of rays enter the visibility region VR independent of the eye position in the viewing space, and the entire reconstructed scene is thus visible in front of the display screen in the visibility region VR.

Thanks to an adequate dimensioning of the spatial filter AP, the wave has on the display screen a cross section which is small in relation to the screen. The effective aberrations of the display screen can thus be neglected for each partial wave.

The invention claimed is:

1. Holographic projection system having a display screen and at least one holographic projector which comprises both spatial light modulator means which modulate a wave for the reconstruction of a scene with holographic information of video holograms and projection means, with which a position controller adjusts a direction of propagation of the modulated wave and an exit position in order to direct the modulated wave through the display screen at a desired eye position, and to track the modulated wave with the reconstructed scene to the desired eye position, wherein the holographic projection system comprises a system controller which:
discretely activates a sequence of modulator segments in the light modulator means, wherein a modulator segment comprises portions of modulator cells to provide individual modulated partial waves in a time multiplex, and which
adjusts with the help of the position controller a direction of propagation which depends on the active modulator segment, and a corresponding exit position of the modulated partial wave such that each active modulator segment directs its modulated partial wave with a reconstructed segment of the scene through a corresponding screen segment on the display screen at a current eye position, where all reconstructed modulated partial waves together render the entire reconstructed scene visible.

2. Holographic projection system according to claim 1, where the system controller adjusts for each current modulated partial wave the direction of propagation and the exit position in dependence on both the current eye position and the position of the active modulator segment on the spatial light modulator means.

3. Holographic projection system according to claim 1 with a holographic projector, which is controlled by the system controller in a time-multiplex process to adjust a direction of propagation and exit position of the partial waves generated by the active modulator segment.

4. Holographic projection system according to claim 3 with a modulator illumination means for the spatial light modulator means, where another spatial light modulator, which is controlled by the system controller, is disposed in the optical path of the light modulator means in order to activate the illumination for individual modulator segments in a time-multiplex process.

5. Holographic projection system according to claim 3, comprising adjustable optical wave tracking means, which sequentially adjust the direction of propagation and exit position of the partial waves in dependence on the position of the active modulator segment on the light modulator means.

6. Holographic projection system according to claim 1, where multiple, locally distributed holographic projectors, which are controlled in a space-multiplex process, reconstruct the scene with partial waves which are characterised by individual directions of propagation and exit positions these direct each modulated partial wave on the hologram side at a corresponding screen segment.

7. Holographic projection system according to claim 6, where the system controller adjusts the directions of propagation and exit positions of the partial waves in dependence on the current eye position and in dependence on the position of the corresponding screen segment on the display screen.

8. Holographic projection system according to claim 6 with encoding means which distribute the holographic information of the current video hologram to hologram segments, and which associate these hologram segments to multiple holographic projectors.

9. Holographic projection system according to claim 1, comprising on the hologram side optical wave splitter means in order to split a wave, which is generated by a holographic projector and which carries the information of the current video hologram of the scene, so to form multiple partial waves which leave the optical splitter means through different exit positions in different directions of propagation.

10. Holographic projection system according to claim 9, where the optical wave splitter means comprise adjustable wave tracking means, which adjust all exit positions and corresponding propagation directions of each partial wave according to the current eye position.

11. Holographic projection system according to claim 1, where the projection means project to the screen segments of the display screen a structure of horizontally staggered partial waves.

12. Holographic projection system according to claim 1, where the size of each modulator segment is dimensioned such that the modulated partial wave, which is directed at the corresponding screen segment by the projection means, and which images the screen segment at the eye position, has a width which is not larger than the width of the visibility region.

13. Holographic projection system according to claim 1, where the directions of propagation and the exit positions of the holographic projector are changed in order to direct the modulated wave through the display screen at a current eye position.

14. Holographic projection system, comprising:
a display screen;
at least one holographic projector, said at least one holographic projector comprising:
spatial light modulator means for modulating a wave for the reconstruction of a scene with holographic information of video holograms;
projection means; and
a position controller for adjusting a direction of propagation of the modulated wave and an exit position, in order to:
direct the modulated wave through the display screen at a desired eye position; and
track the modulated wave with the reconstructed scene to the desired eye position; and
a system controller comprising:
means for discretely activating a sequence of modulator segments in the light modulator means, wherein a modulator segment comprises portions of modulator cells to provide individual modulated partial waves in a time multiplex, and;
means for adjusting, with the help of the position controller, a direction of propagation that depends on the active modulator segment, and a corresponding exit position of the modulated partial wave such that each active modulator segment directs its modulated partial wave with a reconstructed segment of the scene through a corresponding screen segment on the display screen at a current eye position, where all reconstructed modulated partial waves together render the entire reconstructed scene visible.

* * * * *